(12) United States Patent
Yoshizawa et al.

(10) Patent No.: US 9,398,586 B2
(45) Date of Patent: Jul. 19, 2016

(54) ALMOST BLANK SUBFRAME BASED ORTHOGONAL RESOURCE ALLOCATION IN A WIRELESS NETWORK ENVIRONMENT

(71) Applicant: Cisco Technology, Inc., San Jose, CA (US)

(72) Inventors: Takahito Yoshizawa, Boom (BE); Raymond Kwan, Swindon (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 118 days.

(21) Appl. No.: 14/261,812

(22) Filed: Apr. 25, 2014

(65) Prior Publication Data

US 2015/0312902 A1 Oct. 29, 2015

Related U.S. Application Data

(63) Continuation of application No. 14/261,566, filed on Apr. 25, 2014.

(51) Int. Cl.
*G01R 31/08* (2006.01)
*H04W 72/04* (2009.01)

(52) U.S. Cl.
CPC ........ *H04W 72/0426* (2013.01); *H04W 72/042* (2013.01); *H04W 72/0446* (2013.01); *H04W 72/0486* (2013.01)

(58) Field of Classification Search
USPC .................................. 370/336, 235, 252, 329
See application file for complete search history.

(56) References Cited

U.S. PATENT DOCUMENTS

| 2011/0249642 A1 | 10/2011 | Song et al. |
| 2011/0310830 A1 | 12/2011 | Wu et al. |
| 2012/0113843 A1 | 5/2012 | Watfa et al. |
| 2012/0120846 A1 | 5/2012 | Hwang et al. |

(Continued)

FOREIGN PATENT DOCUMENTS

WO  WO 2013/141544  9/2013

OTHER PUBLICATIONS

U.S. Appl. No. 14/261,566, filed Apr. 25, 2014 entitled "Almost Blank Subframe Based Orthogonal Resource Allocation in a Wireless Network Environment," Inventor(s): Takahito Yoshizawa, et al.

(Continued)

*Primary Examiner* — Phuongchau Ba Nguyen
(74) *Attorney, Agent, or Firm* — Patent Capital Group

(57) ABSTRACT

An example method for facilitating almost blank sub-frame (ABS) based orthogonal resource allocation in a wireless network environment is provided and includes receiving at a serving Evolved Universal Terrestrial Radio Access Network (E-UTRAN) nodeB (eNB), ABS patterns from a plurality of neighboring eNBs in a orthogonal frequency-division multiplexing based network, each neighboring eNB transmitting a separate ABS pattern, setting a maximum duty cycle of physical downlink control channel in a frame to be transmitted by the serving eNB within its serving cell, and computing an optimal ABS pattern at the serving eNB subject to the maximum duty cycle and based on the ABS patterns received from the plurality of neighboring eNBs. In specific embodiments, computing the optimal ABS pattern includes identifying neighboring eNBs transmitting at each sub-frame of the frame, identifying sub-frames transmitted by a least number of neighboring eNBs, and selecting each identified sub-frame for configuring as an ABS.

20 Claims, 8 Drawing Sheets

(56) References Cited

U.S. PATENT DOCUMENTS

| | | |
|---|---|---|
| 2013/0084865 A1 | 4/2013 | Agrawal et al. |
| 2013/0107798 A1 | 5/2013 | Gao et al. |
| 2013/0142175 A1 | 6/2013 | Manssour et al. |
| 2013/0194950 A1 | 8/2013 | Haghighat et al. |
| 2013/0250764 A1* | 9/2013 | Vasudevan ............ H04W 16/14 370/235 |
| 2013/0272274 A1* | 10/2013 | Ishida et al. ...... H04W 72/0426 370/336 |
| 2013/0286906 A1 | 10/2013 | Seo et al. |
| 2014/0177558 A1* | 6/2014 | Bagheri ................ H04L 5/0058 370/329 |
| 2014/0321434 A1* | 10/2014 | Gayde et al. ...... H04W 72/0413 370/336 |
| 2015/0029907 A1* | 1/2015 | Cucala Garcia ...... H04L 5/0073 370/278 |
| 2015/0208410 A1* | 7/2015 | Koutsimanis ......... H04W 24/10 370/252 |
| 2015/0223239 A1* | 8/2015 | Lee ...................... H04L 5/0073 370/329 |
| 2015/0249530 A1* | 9/2015 | Zhang ................... H04L 5/0058 370/329 |
| 2015/0312901 A1 | 10/2015 | Yoshizawa et al. |

OTHER PUBLICATIONS

Kwan, Raymond, "Distributed Energy-Saving Mechanism for Self-Organizing Femto LTE Networks," Proceedings of IEEE 2012 Vehicular Technology Conference, pp. 1-5 Quebec City, Canada, Sep. 3-6, 2012.

Lindbom, Lars, et al., "Enhanced Inter-cell Interference Coordination for Heterogeneous Networks in LTE-Advanced: A Survey," (Dec. 7, 2011), Cornell University Library eprint, available at http://arxiv.org/ftp/arxiv/papers/1112/1112.1344.pdf.

Lopez-Perez, David, et al., "Enhanced Inter-Cell Interference Coordination Challenges in Heterogeneous Networks," IEEE Journal of Wireless Communications, vol. 18, No. 3, pp. 22-30 (Jun. 2011), http://arxiv.org/ftp/arxiv/papers/1112/1112.1597.pdf.

USPTO Jan. 20, 2016 Notice of Allowance from U.S. Appl. No. 14/261,566.

* cited by examiner

ALMOST BLANK SUBFRAME BASED ORTHOGONAL RESOURCE ALLOCATION IN A WIRELESS NETWORK ENVIRONMENT

RELATED APPLICATION

This Application is a continuation (and claims the benefit of priority under 35 U.S.C. §120) of U.S. application Ser. No. 14/261,566, filed Apr. 25, 2014, entitled "ALMOST BLANK SUBFRAME BASED ORTHOGONAL RESOURCE ALLOCATION IN A WIRELESS NETWORK ENVIRONMENT," Inventors Takahito Yoshizawa, et al. The disclosure of the prior application is considered part of (and is incorporated by reference in) the disclosure of this application.

TECHNICAL FIELD

This disclosure relates in general to the field of communications and, more particularly, to almost blank sub-frame (ABS) based orthogonal resource allocation in a wireless network environment.

BACKGROUND

Orthogonal frequency-division multiplexing (OFDM) is a method of encoding digital data on multiple carrier frequencies. OFDM is a popular scheme for wideband digital communication (both wired and wireless) in applications such as digital television and audio broadcasting, digital subscriber line (DSL) Internet access, wireless networks, power-line networks, and 4G mobile communications, such as Long Term Evolution (LTE). LTE, marketed as 4G LTE, is a standard for wireless communication of high-speed data for mobile phones and data terminals based on the Global System for Mobile Communications (GSM)/Enhanced Data rates for GSM Evolution (EDGE) and Universal Mobile Telecommunications System (UMTS)/ High Speed Packet Access (HSPA) network technologies. The LTE and related standards are developed by 3rd Generation Partnership Project (3GPP). LTE uses Evolved Universal Terrestrial Radio Access Network (E-UTRAN) radio access network standard for LTETs air interface system. The 3GPP infrastructure provides wired or wireless connections among communicating intermediate stations, called E-UTRAN nodeBs (eNBs). LTE is accompanied by an evolution of non-radio aspects under System Architecture Evolution (SAE), which includes the Evolved Packet Core (EPC) network. LTE and SAE together comprise the Evolved Packet System (EPS).

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for facilitating ABS based orthogonal resource allocation in a wireless network environment is provided and includes receiving at a serving eNB, ABS patterns (e.g., an ABS pattern comprises a temporal location, or subframe indices of ABSs in each frame) from a plurality of neighboring eNBs in a orthogonal frequency-division multiplexing (OFDM) based network, each neighboring eNB transmitting a separate ABS pattern, setting (e.g., assigning, configuring, determining, computing, calculating, etc.) a maximum duty cycle of physical downlink control channel (PDCCH) in a frame to be transmitted by the serving eNB within its serving cell, and computing an optimal ABS pattern at the serving eNB subject to the maximum duty cycle and based on the ABS patterns received from the plurality of neighboring eNBs.

Example Embodiments

Figure 1:
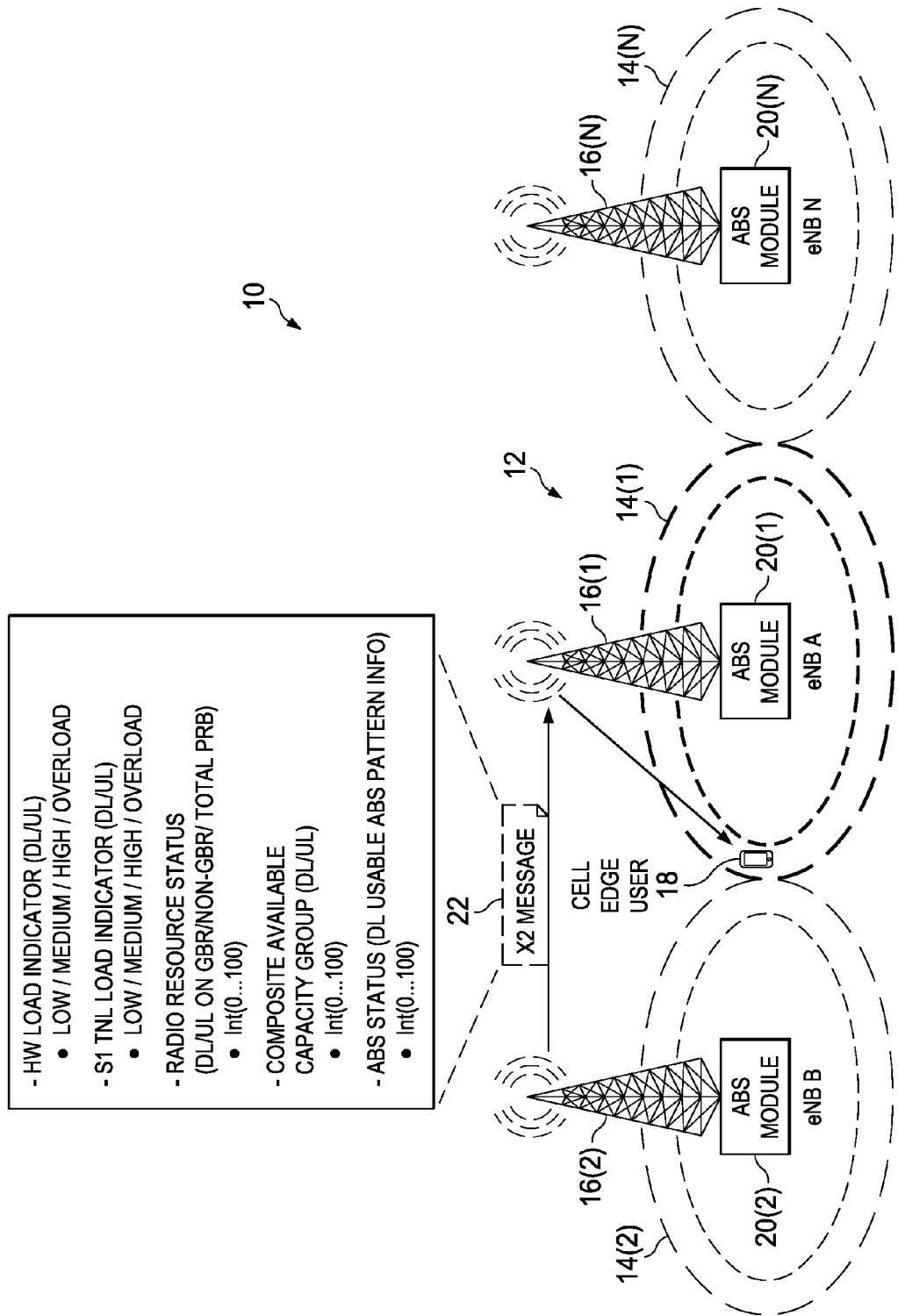
FIG. 1 is a simplified block diagram illustrating a communication system for facilitating ABS based orthogonal resource allocation in a wireless network environment.

Turning to FIG. 1, FIG. 1 is a simplified block diagram illustrating a communication system 10 for facilitating ABS based orthogonal resource allocation in a wireless network environment in accordance with one example embodiment. FIG. 1 illustrates a OFDM based network 12 comprising cells 14(1), 14(2) ... 14(N), served by corresponding eNBs 16(1), 16(2) ... 16(N). Note that network 12 can include any number of cells within the broad scope of the embodiments. A user equipment (UE) 16 in cell 14(1) may be enabled to wirelessly communicate in network 12 by serving eNB 16(1). Each eNB 16(1), 16(2) ... 16(N) may be configured with respective ABS modules 20(1), 20(2) ... 20(N).

According to 3GPP specifications, a cell (e.g., 14(1), 14(2) ... 14(N)) is a geographical area that can be identified by a UE (e.g., UE 16) based on a (cell) identification that is broadcast from a UTRAN access point (e.g., executing at eNB 16(1)). The UTRAN access point is associated with one specific cell; thus there exists one UTRAN access point for each cell. The UTRAN access point is the UTRAN-side end point of a radio link. The radio link is a logical association between a single UE and a single UTRAN access point. Its physical realization comprises one or more radio bearer transmissions. Each eNB 16(1) ... 16(N) comprises a logical node responsible for radio transmission/reception in one or more cells to/from UE 18 (and other UEs in network 12). For example, each eNB 16(1)-16(N) can cover multiple cells within a 120° angle. UE 18 comprises a mobile equipment with one or several UMTS Subscriber Identity Module(s), which includes information to uniquely identify a subscriber (e.g., user).

In various embodiments, serving eNB 16(1) may determine a PDCCH duty cycle and ABS pattern for resource allocation in cell 14(1), and communicate the information to eNB 16(2) through a suitable X2 message (e.g., message over an X2 interface between two communicating eNBs). Resource allocation refers to configuring resources (e.g., signal carriers in frequency and time domain) for enabling radio communication by UE 18 (and other UEs) in network 12. In 3GPP LTE, one Resource Block (RB) comprises 12 consecutive, contiguous sub-carriers (e.g., 15 kHz apart) in the frequency domain. The smallest modulation structure (unit of resource) in LTE is a Resource Element. The Resource Element (RE) is one sub-carrier during one symbol interval (i.e., one symbol long and 1 sub-carrier wide). REs aggregate into RBs. Each RB has dimensions of sub-carriers by symbols (i.e., x symbols long and y sub-carriers wide for an xy sized RB). In some scenarios, twelve consecutive sub-carriers in the frequency domain and six or seven symbols in the time domain form each RB. Thus, for example, each RB can include 72 or 84 REs.

In the time domain, one radio frame (also referred to herein simply as "frame") is 10 milliseconds long and comprises several (e.g., 10) 1 millisecond sub-frames. The sub-frame is a fundamental communication unit that carries control signal and user data. Each sub-frame comprises two 0.5 ms slots. In the time domain, one slot is exactly one RB long. The RB can comprise 72 or 84 REs for the duration of a 0.5 ms slot. Multiple resource blocks are assigned consecutively in the frequency domain to a UE in the uplink whereas dispersed, non-consecutive assignment is done on the downlink. As used herein, "ABS" is a sub-frame with reduced power on some physical channels and/or reduced activity.

In various embodiments, X2 message 22 can enable time domain ABS resource allocation by eNBs 16(1) . . . 16(N) to minimize interference for UE 18. According to various embodiments, ABS modules 20(1) . . . 20(N) can facilitate an optimal allocation of a temporal location of ABSs (i.e., ABS pattern) in a frame taking into account cell-specific impact of neighboring cells. Further, ABS modules 20(1) . . . 20(N) can semi-statically adjust the PDCCH duty cycle (e.g., a percentage of one frame in which the PDCCH is active) by taking into account the corresponding eNB's own cell load and traffic demands.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

OFDM is a frequency-division multiplexing (FDM) scheme used as a digital multi-carrier modulation method. A large number of closely spaced orthogonal sub-carrier signals are used to carry data on several parallel data streams or channels. Each sub-carrier is modulated with a conventional modulation scheme (such as quadrature amplitude modulation or phase-shift keying) at a low symbol rate, maintaining total data rates similar to conventional single-carrier modulation schemes in the same bandwidth. In OFDM, a physical resource comprises two domains: time-domain and frequency-domain. Signals are allocated independently in both domains. The LTE network, which is described in example embodiments is a specific example of the OFDM based network.

The LTE frame carries physical channels and physical signals. Channels carry information received from higher layers. Signals originate at the physical layer. The framing structure is common to the uplink and downlink, but the physical signals and physical channels are different. Physical Downlink Shared Channel (PDSCH) is used to transport user data. Physical downlink control channel (PDCCH) is used to carry resource assignments for UEs (e.g., provide uplink and downlink resource allocations to UEs). The PDCCH maps onto REs in up to the first three OFDM symbols in the first slot of the sub-frame. For a bandwidth of 1.4 MHz, it is possible to have up to 4 OFDM symbols. Thus, the PDCCH mapping is bandwidth dependent.

In a general sense, each downlink sub-frame can include two regions: control region and data region. The control region size can be dynamically variable. Within the control region, the PDCCH carries downlink control information (DCI) messages comprising downlink resource assignments, uplink resource grants, uplink power control commands, etc. Each control region comprises control channel elements (CCEs), each of which is a nine set of four resource elements known as Resource Element Groups (REG) (e.g., each CCE is a group of 9 consecutive REGs; each REG is a group of 4 consecutive REs). The data region carries PDSCH information.

In LTE, PDCCH signal quality is an important performance factor. PDCCH carries the upper layer signaling traffic including radio resource control (RRC) messages and non-access stratum (NAS) messages. The PDCCH signal quality determines reliability of signaling in the control plane, potentially influencing reliability of the overall user plane, such as handover (HO) performance and call reliability. The PDCCH signal quality can be especially significant at the cell edge where the signal quality degrades inversely proportional to the distance between the eNB and the UE and as interference from the adjacent cell(s) increase. Because OFDMA lacks a Soft HandOver functionality as in WCDMA, signal quality from the serving cell can be of prime importance. Improving the control plane signal quality of the serving cell, for example, at cell edges, can improve the overall performance (of both control plane and user plane).

Inter-cell interference coordination (ICIC) in LTE is used to minimize interference at the UE from neighboring cells. According to an ICIC scheme, neighboring eNBs use different sets of RBs throughout the cell at any given time (e.g., no two neighboring eNBs use the same resource assignments for their UEs). The scheme can greatly improve cell-edge signal-to-interference-plus-noise-ratio (SINR). The disadvantage of the scheme is decrease in throughput throughout the cells, because full RBs are not utilized. In another ICIC scheme, all eNBs utilize a complete range of RBs for centrally located users, whereas no two neighboring eNBs uses the same set of RBs at any given time for cell-edge users. The X2 interface is used to share the ICIC information between the eNBs.

Enhanced ICIC (eICIC) is typically used in heterogeneous networks comprising different sized cells (e.g., macro and pico cells). eICIC mitigates interference on traffic and control channels. eICIC uses power, frequency and time domain to mitigate intra-frequency interference in heterogeneous networks. eICIC uses the ABS, which are mostly control channel frames with very low power and used to coordinate inter-cell interference in the time domain. The ABS typically does not contain either PDCCH or PDSCH information. During ABS, the transmitting eNB does not transmit PDSCH but, may transmit critical control channels, and broadcast and paging information (e.g., for ensuring legacy device support).

In time domain, if a macro cell configures ABS sub-frames, UEs connected to pico/femto cells within an overlapping coverage of the macro cell can communicate data during such ABS frames and avoid interference from the macro cell. In frequency-domain eICIC, control channels and physical signals (e.g., synchronization signals and reference signals) of different cells are scheduled in reduced bandwidths in order to have totally orthogonal transmission of these signals at different cells.

In a general sense, time domain ABS resource allocation can be challenging. In a frequency-domain approach to resource allocation, the signal is allocated to one RE so that no two REs collide across signals from two cells in the same carrier. In a time-domain approach to resource allocation, the signal is allocated to the RE of a carrier from one cell at any given time so that no two adjacent cells use the same RE simultaneously. By turning the sub-frame into ABS, the PDCCH in ABS can be removed, thereby avoiding interference contribution to the neighboring cells. However, the ABS cannot carry data, thereby reducing the throughput. Because ABSs severely penalizes the capacity, its usage has been reserved primarily for Heterogeneous Networks (HetNets).

In a general HetNet deployment, it is possible to have macrocells, picocells, and femtocells coexisting in the same geographical area. The macrocell is the aggressor relative to the picocell, (e.g., picocell is the victim). In the case of femto cells, both macro and pico UEs are victims of the femto cells due to the fact that femto cells are often configured to operate in a Close Subscriber Group (CSG) mode. The CSG cell only allows access to UEs which have a valid private subscription. Thus, an unsubscribed UE would not be served. Subsequently, to an unsubscribed UE, a CSG Home eNB (HeNB) would act as a source of interference. One way to mitigate interference coming from a HeNB would be for the HeNB to introduce ABS patterns, for example, similar to a macro eNB (MeNB)-picocell eNB (PeNB) case.

For example, the throughput of the pico UEs increases with a larger number of ABSs configured in each frame of the macro cell. However, increasing the number of ABSs can reduce the available sub-frames for the macro UEs and thus decrease their throughput. Thus, the appropriate ABS ratio (number of ABSs over a total number of sub-frames in a frame) and an ABS pattern (positions of ABSs in each frame) may be considered to coordinate interference between the macro and pico/femto cells.

In an existing mechanism to optimize ABS use, an initial ABS pattern is chosen by a macro eNB based on a victim pico UE reporting from a neighboring pico eNB; subsequently, the ABS pattern is adjusted based on the request of the pico eNB and the ABS pattern in stored in the macro eNB. The neighboring macro eNBs may update the stored ABS patterns based on reports of interfering macro cells from the pico eNB. The information to update ABS patterns are communicated over the X2 interface.

Communication system 10 is configured to address these issues (and others) in offering a system and method for facilitating ABS based orthogonal resource allocation in a wireless network environment. According to an embodiment of communication system 10, serving eNB 16(1) may receive ABS patterns from plurality of neighboring eNBs 16(2)-16(N) in OFDM based network 112, each neighboring eNB 16(2)-16(N) transmitting a separate ABS pattern. Serving eNB 16(1) may set a maximum duty cycle of PDCCH in a frame to be transmitted by serving eNB 16(1) within its serving cell, and compute an optimal ABS pattern at serving eNB 16(1) subject to the maximum duty cycle and based on the ABS patterns received from plurality of neighboring eNBs 16(2)-16(N). In specific embodiments, computing the optimal ABS pattern includes identifying neighboring eNBs 16(2)-16(N) transmitting at each sub-frame of the frame, identifying sub-frames transmitted by a least number of neighboring eNBs 16(2)-16(N), and selecting each identified sub-frame for configuring as an ABS.

According to various embodiments, a group of cells 14(1)-14(N) in network 112 may comprise of two or more cells. Within the group, each pair of two cells (e.g., cells 14(1) and 14(2)) that cover an adjacent coverage area can establish an X2 interface between corresponding eNBs (e.g., 16(1) and 16(2)) to directly communicate with each other using X2AP protocol according to 3GPP specifications. (According to LTE standards, the eNBs are normally interconnected with each other by means of an interface known as "X2," to a Mobility Management Entity (MME) by means of an "S1-MME" interface and to a serving gateway (S-GW) by means of an "S1-U" interface.) In the X2 interface, eNBs 16(1) and 16(2) in cells 14(1) and 14(2), respectively, may exchange information useful to achieve and maintain coordination between them for resource allocation. The messages can be used for various purposes, including for effecting a self-organized network (SON).

X2 message 22 may be used to achieve coordination of ABS usage between two eNBs 16(1) and 16(2) in adjacent cells 14(1) and 14(2), respectively, for example, to minimize interference between them during resource usage optimization. According to an embodiment of communication system 10, eNBs 16(1) and 16(2) in adjacent cells 14(1) and 14(2), respectively, may exchange its own resource allocation in time-domain. Each eNB 16(1) and 16(2) in adjacent cells 14(1) and 14(2), respectively, can express the time-domain resource allocation using a binary bit having a value of 0 or 1 to indicate a resource allocation. For example, a value of "0" for an appropriate region of the RB may indicate that a given eNB has allocated the ABS in a specific RB, and a value of 1 for the appropriate region of the RB may indicate that the given eNB has not allocated the ABS in the specific RB. Thus, the bit sequence of 0 and 1 can indicate the ABS pattern of the respective cell.

By exchanging the ABS pattern through the bit sequence, two adjacent eNBs (e.g., 16(1) and 16(2)) can acquire knowledge of each other's resource allocation during a certain time period. Thus, by comparing the ABS pattern with its own resource allocation during the same time period, each eNB 16(1)-16(N) can detect any collision of resource allocation with respect to the adjacent cell. Further, by using the information exchanged over the X2 interface, eNBs 16(1)-16(N) can calculate a chance of collision of resource allocation. Thus, each eNB 16(1)-16(N) can adjust its own resource allocation behavior to avoid or minimize resource allocation collision. The ABS pattern exchange and subsequent adjustment in resource allocation may comprise an iterative process substantially continuously carried out in eNBs 16(1)-16(N), for example, to achieve and maintain minimal interference.

In an example embodiment, X2 message 22 may comprise a resource status update message according to X2AP specification (3GPP TS 36.423). The standard X2AP message format can be expanded in X2 message 22 to carry additional resource allocation information, for example, to facilitate ABS allocation coordination across eNBs 16(1)-16(N). For example, X2 message 22 may comprise an X2AP resource status update message that allows serving eNB 16(1) to evaluate whether or not it can reduce the number of ABSs in the frame, thereby increasing its own throughput. The information elements in X2 message 22 can include a downlink ABS status (e.g., specifying a percentage of used ABS resources from within a set of usable ABS resources), and a usable ABS pattern bitmap (e.g., specifying a set of ABS that neighboring eNB 16(2) can use).

There can be multiple types of information that can be exchanged over X2 message 22, for example, to derive resource allocation at local cell 14(1). By way of examples, and not as limitations, the information can include: 1) interference level; 2) traffic load; and 3) PDCCH duty cycle. eNBs 16(1)-16(N) may also consider their own local information for the resource allocation decision. In some embodiments, X2 message 22 may comprise a load information message, which includes an ABS information Information Element (IE). Within the ABS information IE, an ABS Pattern Information Bitmap specifies a sequence of bits, with '1' denoting a bit indicating the presence of an ABS sub-frame, and '0' otherwise. For the case of Frequency Division Duplex (FDD) mode, the bitmap has a length of 40 bits, spanning 4 radio frames, with the pattern repeating every 4 radio frames. The length of 40 bits can correspond to a duty cycle periodicity of 40 ms.

In a specific embodiment, each eNB 16(1)-16(N) can use information (e.g., interference level, traffic load, and PDCCH duty cycle) obtained from X2 message 22 as input parameters to calculate ABS resource allocation at respective eNBs 16(1)-16(N). eNBs 16(1)-16(N) can also use local information (e.g., cell's own interference level, traffic load, assumed PDCCH duty cycle) as input parameters to calculate ABS resource allocation at respective eNBs 16(1)-16(N).

According to various embodiments, the ABS resource allocation can include at least three parts: 1) exchange of resource allocation with eNBs in adjacent cells, which includes transmitting the eNB's own resource allocation information and receiving corresponding information from the eNB in the adjacent cells; 2) detection of collision in resource allocation between the eNBs; and 3) deriving and adjusting resource allocation to avoid or minimize resource collision while maximizing PDCCH in the local cell. In various embodiments, ABS modules 20(1)-20(N) can provide a desirable trade-off between respective cell throughput and protection of a level of PDCCH to neighboring cells.

In a general sense, the amount of resources allocated to the PDCCH can be varied. However, if the allocated amount is too small, uplink and downlink data schedulers may not be able to schedule all UEs in the cell, but if the allocated amount is too large, resources that could have been used for transmitting data are wasted. Moreover, if the neighboring cell schedules its UEs in sub-frames that overlap with the serving cell's ABS transmissions, the neighboring cell "protects" its UEs from strong inter-cell interference, thereby improving the chances of successful PDCCH reception by the UEs.

According to various embodiments, PDCCH interference from adjacent cells may be minimized (or avoided) in the serving cell (e.g., cell 14(1)). PDCCH interference can be prominent at the cell-edge UE 18, where the difference in signal strengths arriving at the UE from multiple cells is small. In some embodiments, ABS modules 20(1)-20(N) may execute an algorithm to define the ABS pattern, which can then be exchanged between respective eNBs 16(1)-16(N). In one example embodiment, the ABS information of the load Information message of X2AP can be used in X2 message 22 to carry the temporal location of ABS (e.g., ABS pattern).

Embodiments of communication sytem 10 can provide a framework to perform an optimal ABS allocation such that the impact of interference from the neighboring cells on PDCCH is minimized. Also, the framework can allow eNBs 16(1)-16(N) to balance own cell performance on one hand, and protection of the neighboring PDCCH on the other hand. In an example embodiment, the balance may be achieved by adaptively adjusting a maximum number of ABSs used. By decreasing the maximum number of ABSs, more sub-frames can be used for carrying data via PDSCH at the expense of more PDCCH interference to the neighboring eNBs. On the other hand, increasing the maximum number of ABSs provides more PDCCH to the neighboring eNBs at the expense of the eNB's own throughput.

Embodiments of communication sytem 10 can facilitate deriving optimal temporal location of the ABS by considering ABS information received from neighboring cells. The ABS allocation framework according to the embodiments allows eNBs 16(1)-16(N) to consider relative impact of neighboring cells, and increase efficiency of ABS pattern selection. In some embodiments, the ABS allocation framework allows flexibility to define a maximum PDCCH duty cycle (which can be an inverse of the ABS duty cycle) within a given time duration to facilitate a pre-defined trade-off between cell throughput and level of PDCCH protection for the neighboring cells.

Embodiments of communication sytem 10 can derive an optimal temporal location of the ABS (e.g., ABS pattern) by minimizing contention of ABSs across multiple neighboring cells 14(1)-14(N). PDCCH interference across multiple adjacent cells 14(1)-14(N) may be reduced with potential improvement in signal quality. Overall PDCCH signal quality to UE 18 (and other UEs in network 112) may be improved under the coverage area, with additional benefit to the cell-edge UEs (e.g., UE 18) where the signal degradation and interference is usually higher than cell-center UEs. Embodiments of communication system 10 can improve cell wide control signal quality between cell-centers and cell-edges. The reliability of control plane signaling can be improved, with potential improvement in overall call quality and user experience.

From a commercial point of view, embodiments of communication sytem 10 can reduce impact of inter-cell interference on the PDCCH of the neighboring cells, potentially enhancing accuracy of receptions of the downlink control channels by UEs. As probability of correct decoding of the control channel improves, probability of dropped calls may be reduced. Such performance improvement may have a direct impact on the network operator's business, allowing the network operator to define a soft tradeoff between own cell throughput and PDCCH protection level of the neighboring cells with consequent additional potential for network optimization and tuning. According to some embodiments, a more flexible cell deployment may be facilitated, for example, by allowing serving eNB 16(1) to measure and decide which neighboring cells have higher interference impact autonomously and subsequently select the ABS pattern dynamically in order to minimize the impact towards the impacted neighboring cells.

Embodiments of communication sytem 10 may be implemented in heterogeneous networks and homogeneous networks, including macro cell/pico (or femto) cell, small cell/small cell and micro cell/micro cell deployments. In embodiments wherein macro, pico, and femto cells are active within a common geographical area, the offending macro and femto cells may both require use of ABS sequences, wherein the optimal ABS sequence selection as described herein can be used between the macro and femto cells. Embodiments of communication sytem 10 may specify a way of performing ABS resource allocation optimally such that the potentially impact of the neighboring cells is considered individually. Thus, the temporal allocation of the ABSs can be steered towards cells that potentially experience the most impact (e.g., in crowded areas, or heavily trafficked areas), thereby increasing the effectiveness of the allocation. In addition, embodiments of communication sytem 10 allow the duty-cycle of the ABS within a fixed time duration to be semi-statically adjusted, for example, to provide a desirable trade-off between own cell throughput and level of PDCCH protection to the neighboring cells.

In embodiments including HetNet, network 112 may comprise macrocells and picocells, which are randomly deployed within each macrocell. One of the main challenges is interference management between the macrocell and picocell, corresponding to a cross-tier interference problem specific to the co-channel HetNet deployment. In LTE-Advanced networking technologies, it is possible for a picocell to extend its range by adjusting the UE measurement bias, thereby making the picocell more attractive from the UEs' perspective. The extended range is commonly known as Cell Range Extension (CRE). However, UEs within CRE region of the picocell would typically experience a higher interference in the downlink from the macrocell. In this context, the macrocell is known as the aggressor, and the picocell is considered as the victim cell.

Due to the higher interference, the performance of the CRE UEs would be benefited if the picocell eNB (PeNB) can transmit to the UEs when the macro cell is in ABSs. Let Rand $R_{i,p}^{(1)}$ and $R_{i,p}^{(2)}$ be the average bit rate per subframe achievable by UE i, in picocell p in the CRE and non-CRE region respectively. Let $S_p^{(1)}$ and $S_p^{(2)}$ be the set of UEs within picocell p within CRE and non-CRE region respectively. Furthermore, let $N^{(1)}$ and $N^{(2)}$ be the number of ABS and non-ABS subframes respectively. The ratio $\eta_p$ of average bit rate achievable by UEs in the CRE region to those in the non-CRE region can be expressed as $$\eta_p = \frac{\frac{N^{(1)}}{|S_p^{(1)}|} \sum_{i \in S_p^{(1)}} R_{i,p}^{(1)}}{\frac{N^{(2)}}{|S_p^{(2)}|} \sum_{i \in S_p^{(2)}} R_{i,p}^{(2)}}$$

where $|S_p^{(1)}|$ and $|S_p^{(2)}|$ correspond to the number of UEs within the sets $S_p^{(1)}$ and $S_p^{(2)}$ respectively. In other words, the formula above compares the relative performance (i.e. aggregate data rate at the cell level) in both CRE (cell-edge) and non-CRE (cell-center) regions. Based on $\eta_p$, the PeNB can compute a "happiness indicator" $\rho_p$ such that $$\rho_p = \begin{cases} 1 & \text{if } \eta_p \leq \widetilde{\eta_p} \\ 0 & \text{otherwise} \end{cases}$$

where $\widetilde{\eta_p}$ is a threshold. The level of "happiness" increases at the pico cell if the aggregate UE performance at the CRE area increases, dependent on the number of ABS frames used by the dominant macrocell. Note that the above is expressed in discrete value. To provide a more descriptive representation of the "happiness", it is possible to express the happiness indicator as a continuously changing variable. For example, an alternative representation of $\rho_p$ can be expressed as $$\rho_p = \min\left(B, \frac{\widetilde{\eta_p}}{\eta_p}\right)$$

where the quantity B is a constant to limit the value of the ratio.

Subsequently, PeNB will then send $\rho_p$ to its macro neighbor(s) eNBs that have a considerable interference impact to the sending PeNB. Upon receiving the quantity $\rho_p$, the macro eNB (MeNB) would then lower or increase the number of ABS subframes to adjust the level of picocell protection. More generally, the average rates $R_{i,p}^{(1)}$ and $R_{i,p}^{(2)}$ in the above ratio $\eta_p$ can be replaced by general utility functions $U_{i,p}^{(1)}(R_{i,p}^{(1)})$ and $U_{i,p}^{(2)}(R_{i,p}^{(2)})$, which are typically (but not necessarily limited to) a concave function such as a logarithmic function $\log_b X$.

In various embodiments, serving eNB 16(1) may determine dominant neighboring eNBs (e.g., neighboring eNBs most likely to cause significant interference) in its vicinity. In one example embodiment, UEs (e.g., UE 18) of serving cell 14(1) can be instructed to measure a reference signal received power (RSRP) of neighboring cells and report back to serving cell eNB 16(1). (RSRP is a basic UE physical layer measurement and is a linear average (in watts) of downlink reference signals (RS) across a channel bandwidth. The RS exists only for one symbol at a time, therefore the RSRP measurement is made only on those REs that contain cell-specific RS. RSRP provides the UE with essential information about strength of cells from which path loss can be calculated.) Neighboring cells with an aggregated path loss below a certain threshold can be added to a dominant neighbor list at serving eNB 16(1) for PDCCH ICIC purposes. Path loss (or path attenuation) is the reduction in power density (attenuation) of an electromagnetic wave as it propagates through space.

In another embodiment, serving eNB 16(1) can find the RS power information from system information block (SIB) 2. (Typically, cell-specific RS are embedded in an overall signal bandwidth at certain REs. For example, in the frequency domain, every 6th subcarrier carries a RS. In the time domain, every 4th symbol carries the RS symbols. The RS pattern can be a pseudo-random sequence, whose generation depends on the cell's identity and cyclic prefix. The RS can be found by decoding SIB 2 from various eNBs.) The combination of the RS information from neighboring eNBs can be used to obtain path loss between the UEs with respect to neighboring cells 14(2)-14(N). For each neighboring cell 14(2)-14(N), the path loss information can be aggregated among all reporting UEs at serving cell 14(1). Neighboring eNBs with an aggregated path loss below a certain threshold can be added to the dominant neighbor list for PDCCH ICIC purposes.

Based on information exchange in X2 message 22 (received from each neighboring eNB 16(2)-16(N)), the ABS patterns of dominant neighboring eNBs 16(2)-16(N) may be known by eNB 16(1). According to an embodiment of communication system 10, the ABS pattern in the frames may be determined as follows. For each sub-frame, an aggregate impact of interference due to the neighboring eNBs 16(2)-16(N) may be calculated at serving eNB 16(1). Based on X2 message 22, eNB 16(1) may know whether each of the neighboring eNBs 16(2)-16(N) can transmit at a certain sub-frame. Serving eNB 16(1) can calculate a total number of neighboring eNBs who can transmit at each sub-frame. Serving eNB 16(1) may attempt to find P sub-frames at which a least number of neighboring eNBs can transmit.

However, selecting the sub-frames may not take into account the relative impact of each of the transmitting neighboring eNBs 16(2)-16(N). For example, even when two neighboring eNBs (say eNB 16(2) and 16(N)) declare to transmit at sub=frame i, if one neighboring eNB (e.g., eNB 16(N)) is geographically located farther from serving eNB 16(1) than the second neighboring eNB (e.g., eNB 16(2)), the relative impact of the first neighboring eNB(e.g., eNB 16(N))

compared to the second neighboring eNB (e.g., eNB 16(2)) on interference at serving eNB 16(1) may be smaller.

According to some other embodiments, a weight may be assigned to each neighboring eNB 16(2)-16(N) by serving eNB 16(1) for each sub-frame. Any suitable method for assigning weights may be used within the broad scope of the embodiments. Each sub-frame may be selected based on a sum of weights corresponding to neighboring eNBs 16(2)-16(N) who declare that they can transmit at the sub-frame. A probability of selecting each sub-frame for generating the ABS pattern may be called the sub-frame's "selectability." After collecting the selectability of each sub-frame for ABS patterns for substantially all neighboring eNBs 16(2)-16(N), serving eNB 16(1) may select P sub-frames having the least impact from neighboring eNBs 16(2)-16(N).

In various embodiments, assigning the weights may include considering various network parameters, including: (1) received RSRP at a network monitor mode (NMM) of serving eNB 16(1) from neighboring eNBs 16(2)-16(N) (an NMM is a receiver geographically located at a location of serving eNB 16(1), and is used to sense the network environment. Its behavior is similar to a UE receiver); (2) transmit RS power at the NMM of serving eNB 16(1) from neighboring eNBs 16(2)-16(N) (the transmit RS power can be obtained from the SIB2 of neighboring eNBs 16(2)-16(N)); (3) received RSRP at the UE receivers from neighboring eNBs 16(2)-16(N); (4) transmit RS power (e.g., obtained from SIB2) at the UEs from neighboring eNBs 16(2)-16(N); (5) path losses between eNB 16(1) and each of neighboring eNBs 16(2)-16(M) (e.g., path losses may be calculated based on received RSRP and transmit RS power from neighboring eNBs 16(2)-16(N) at eNB 16(1); for example, path loss can be computed as a difference between RSRP and transmit RS power in dB); (6) path losses between each of the connected UEs and each neighboring eNB 16(2)-16(N) (e.g., path losses can be computed based on received RSRP and RS power from neighboring eNBs 16(2)-16(N) at the UE); (7) traffic load of each neighboring eNB 16(2)-16(N).

In mathematical terms, let $x_{i,m}$ be a binary digit (e.g., 0, 1) with '1' denoting that the PDCCH is active in sub-frame m for cell i, and zero otherwise, where $1 \leq m \leq M$ (M being any integer representing the maximum number, e.g., 10, of sub-frames in a frame). An active PDCCH can imply that the sub-frame is not an ABS. Let $x_i = (x_{i,1}, x_{i,2}, \ldots, x_{i,M})$ be a bit sequence used by cell i, $1 \leq i \leq N$. The bit sequence $x_i$ can be obtained at serving cell j based on two sources of information: 1) ABS information IE in the X2AP Load information message from neighboring cells that provides the ABS sub-frames to serving cell j; and 2) the Usable ABS Pattern Bitmap within the X2AP Resource Status Update message that provides the set of ABSs that corresponding neighboring cells use.

Let $S_j$ be the set of neighboring cells for serving cell j $\notin S_j$. The ABS selectability can be reduced to selecting $x_j$ as follows:

$$\min_{x_j} \left( \sum_{\substack{i \in S_j \\ j \notin S_j}} a_i \sum_{m=1}^{M} x_{i,m} x_{j,m} \right)$$

subject to $$\sum_{m=1}^{M} x_{j,m} = N_j^{(max)}$$

where $N_j^{(max)}$ is the maximum duty cycle of sub-frames with PDCCH (e.g., non-ABS sub-frames) for cell j, and $a_i$, $i \in S_j$ is a neighbor-specific weight that quantifies a relative level of impact from cell i to serving cell j. The weight can be based on the impact of interference, which can be computed based on, but not limited to, dominant neighbor selection process.

The computational procedure to select $x_j$ is as follows: (1) for each m, compute a weighted sequence $X_m$:

$$X_m = \sum_{\substack{i \in S_j \\ j \notin S_j}} a_i x_{i,m}$$

Rank the set $\{X_m, m=1,2, \ldots M\}$ such that $X_{(1)} \leq X_{(2)} \leq \ldots \leq X_{(M)} \ldots \leq X_{(M)}$. Note that the sub-frame index corresponding to $X_{(m)}$ is no longer m. Define $Q_j$ to be a set of sub-frame indices corresponding to the sub-frame indices of $\{X_{(1)}, X_{(2)}, \ldots, X_{(N_j^{(max)})}\}$; set $x_{j,m}=1$ if m $\in Q_j$, and $x_{j,m}=0$ otherwise.

Note also that the value of $N_j^{(max)}$ can be adaptive, depending on a number of factors. One such factor may include general satisfaction with the throughput performance. As $N_j^{(max)}$ is reduced, the number of sub-frames available for ABS is higher. Thus, the cell-satisfaction such as the throughput can be continuously monitored. If the throughput is below a certain threshold over a pre-defined time period, $N_j^{(max)}$ can be increased. Adjustment of the maximum PDCCH duty cycle can allow a level of orthogonalization to be flexible and dynamic. In some embodiments, a level of radio link failure, energy saving (e.g., based on a number of connected UEs), and handover failure can be monitored. When the radio link and/or handover failure are above a certain threshold, serving eNB 16(j) can send a "request" message to its dominant neighboring eNBs to make a suggestion to lower the value of $N_j^{(max)}$. In some embodiments when a number of connected UEs falls below a certain threshold, the maximum duty cycle in the cell may be reduced to save energy by transmitting less often.

In various embodiments, eNB 16(1) can semi-statically (e.g., semi-dynamically) change the value of $N_1^{(max)}$, the maximum duty cycle of sub-frames with PDCCH for cell 14(1). Each eNB 16(1)-16(N) can adjust its own maximum PDCCH duty cycle value depending on local traffic demand (e.g. number of UEs camped on a cell, hysteresis of past time periods, time of day, estimated traffic, etc.) and other suitable factors. Also, serving eNB 16(1) can take into account a Resource Status Update information from neighboring eNBs 16(2)-16(N). In various embodiments, each neighboring eNB 16(2)-16(N) may behave in a more cooperative (e.g., less greedy) manner by lowering respective maximum duty cycle values, thus allowing serving cell 14(1) to have more available resources for PDCCH allocation.

Turning to the infrastructure of communication system 10, the network topology of network 112 can include any number of UEs, eNBs, switches and routers, and other nodes interconnected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Communication sytem 10 may include network configurations capable of TCP/IP communications for the electronic transmission or reception of data packets in a network. Communication sytem 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in network 112.

The example network environment may be configured over a physical infrastructure that may include one or more networks and, further, may be configured in any form including, but not limited to, cellular networks, local area networks (LANs), wireless local area networks (WLANs), VLANs, metropolitan area networks (MANs), wide area networks (WANs), Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, power-line, etc. or any suitable combination thereof. In other embodiments, communication links may represent a remote connection through any appropriate medium (e.g., digital subscriber lines (DSL), telephone lines, T1 lines, T3 lines, wireless, radio, satellite, fiber optics, cable, Ethernet, etc. or any combination thereof) and/or through any additional networks such as a wide area networks (e.g., the Internet).

The techniques described herein may be used in any OFDM network, including, by way of examples and not as limitations, cable-based networks(e.g., Asymmetric digital subscriber line (ADSL) and Very-high-bit-rate digital subscriber line (VDSL) broadband access via copper wiring; Digital Video Broadcasting—Cable (DVB-C2); Power line communication (PLC); ITU-T G.hn standard for high-speed local area networking of existing home wiring; etc.) and wireless networks (e.g., wireless LAN (WLAN) radio interfaces IEEE 802.11a, g, n, ac and HIPERLAN/2; digital radio systems DAB/EUREKA 147, DAB+, Digital Radio Mondiale, HD Radio, T-DMB and ISDB-TSB; terrestrial digital TV systems DVB-T and ISDB-T; terrestrial mobile TV systems DVB-H, T-DMB, ISDB-T; wireless personal area network (PAN) ultra-wideband (UWB) IEEE 802.15.3a implementation; 4G and pre-4G cellular networks and mobile broadband, including IEEE 802.16e (or Mobile-WiMAX), mobile broadband wireless access (MBWA) standard IEEE 802.20).

The techniques described herein may be used for various wireless communication networks including frequency division duplexing (FDD) and time division duplexing (TDD) of orthogonal frequency-division multiple access (OFDMA) (e.g., LTE and similar technologies) and that can also include other wireless technologies (e.g., in hybrid scenarios), such as code division multiple access (CDMA), time division multiple access (TDMA), frequency division multiple access (FDMA), OFDMA, single carrier frequency-division multiple access (SC-FDMA), etc. The CDMA network may implement a radio technology, such as UTRA, Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA.

A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP LTE and LTE-Advanced (LTE-A) are newer releases of the UMTS that use E-UTRA. UTRA, E-UTRA, UMTS, LTE, LTE-A and GSM are described in 3GPP documents. CDMA2000® and UMB are described in 3GPP2 documents. The techniques described herein may be used for the wireless networks and radio access technologies mentioned above, as well as other wireless networks and radio access technologies.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication sytem 10 shown in FIG. 1 is simplified for ease of illustration.

In various embodiments, network 112 can include a general cellular network. In other embodiments, network 112 can include an enterprise network, for example, a cellular network operating within an enterprise context. In yet other embodiments, network 112 can include a wide area network, and other types of wireless networks. In a general senses, UE 18 may include any type of device capable of communicating according to ODFM protocols with eNBs 16(1)-16(N), including smart phones, laptops, tablets, sensors, servers, and appliances.

In various embodiments, eNBs 16(1)-16(N) can include any type of suitable network elements configured to perform the ABS operations and other 3GPP functionalities described herein. As used herein, the term "network element" is meant to encompass computers, network appliances, servers, routers, switches, gateways, bridges, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

eNBs 16(1)-16(N) comprise hardware connected to network 112 that communicates directly with UE 18, for example similar to a base transceiver station (BTS) in GSM networks, and are responsible for substantially all radio related functions (e.g., radio resource management, header compression, security, etc.). eNBs 16(1)-16(N) may embed their own control functionality, or may use a radio network controller within the broad scope of the embodiments. eNBs 16(1)-16(N) can include one or more chips (e.g., chipset) configured to provide mobile data transfer services according to LTE protocols. eNBs 16(1)-16(N) may be interconnected with each other and with other network elements by suitable interfaces (e.g., with each other by the X2 interface; to an MME by a S1-MME interface; and to an S-GW by a S1-U interface; etc.).

Figure 2:
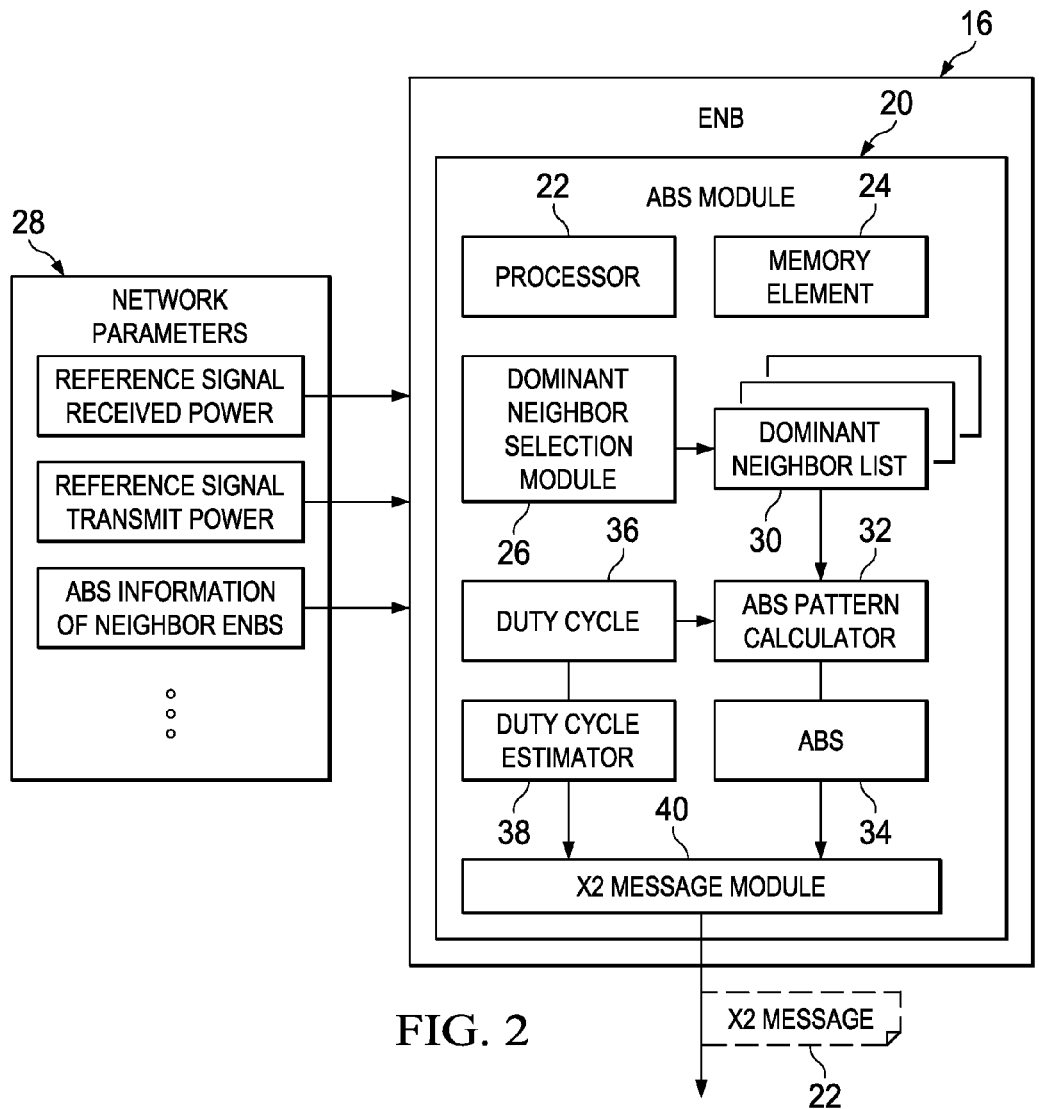
FIG. 2 is a simplified block diagram illustrating example details of an embodiment of the communication system.

Turning to FIG. 2, FIG. 2 is a simplified block diagram illustrating example details of an embodiment of communication system 10. An example eNB 16 may include ABS module 20, comprising a processor 22 and a memory element 24, among other components. A dominant neighbor selection module 26 may receive network parameters 28 from UEs and neighboring eNBs and generate a dominant neighbor list 30. Dominant neighbor list 30 may comprise any suitable table, array, list, or other storage element suitable for storing identifiers of neighboring eNBs and corresponding network parameters 28. Network parameters 28 may include parameters indicative of path loss between eNB 16 and neighboring eNBs, and parameters used to recognize ABS patterns used by neighboring eNBs, PDCCH duty cycles of neighboring eNBs, and other information that can be used in calculating eNB 16's optimal ABS pattern. Network parameter 28 may be aggregated, extracted, identified, etc. from X2 messages sent by neighboring eNBs, measurement reports by UEs, NMM measurements, etc. An ABS pattern calculator 32 may determine an ABS pattern 34 based on dominant neighbor list 30 and corresponding ABS information of neighboring eNBs and a (PDCCH) duty cycle 36, calculated at a duty cycle estimator 38. ABS pattern 34 may be inserted by an X2 message module 40 into X2 message 22 and transmitted to neighboring eNBs.

Figure 3:
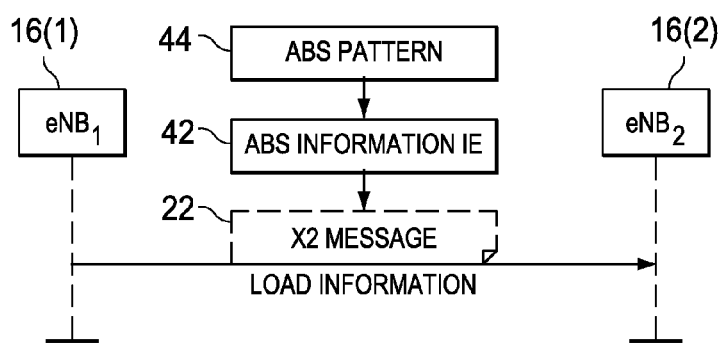
FIG. 3 is a simplified block diagram illustrating yet other example details of an embodiment of the communication system.

Turning to FIG. 3, FIG. 3 is a simplified block diagram illustrating example details of an embodiment of communication system 10. eNB 16(1) may send X2 message 22 comprising load information to eNB 16(2). X2 message 22 comprising load information may include an ABS information IE 42 comprising an ABS pattern 44. In many embodiments, X2 message 22 may substantially comply with X2AP specifications of 3GPP.

Figure 4:
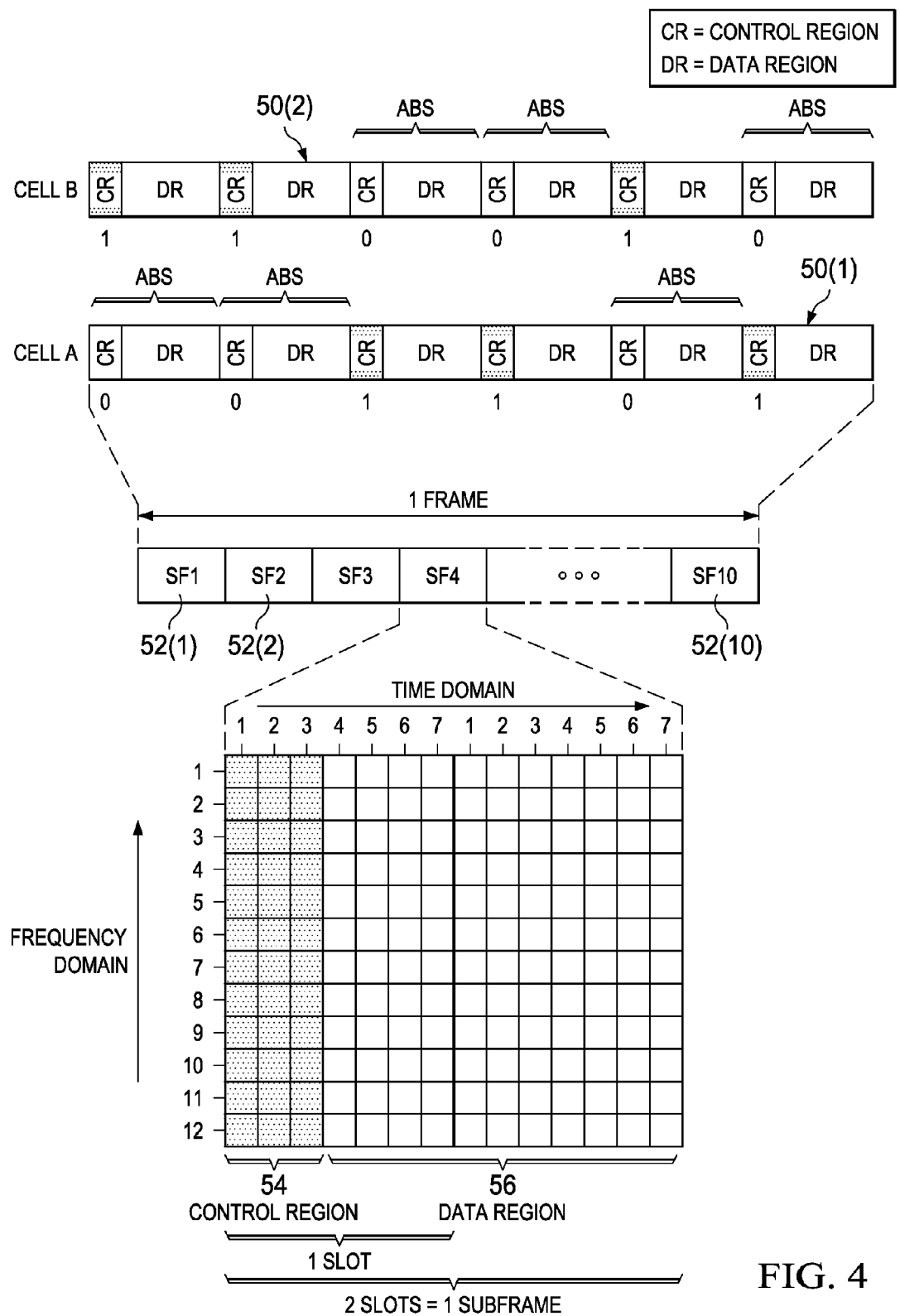
FIG. 4 is a simplified block diagram illustrating yet other example details of an embodiment of the communication system.

Turning to FIG. 4, FIG. 4 is a simplified block diagram illustrating example details of a frame structure of E-UTRAN air interface used in LTE according to an embodiment of communication system 10. Frames 50(1) and 50(2) in cell A 14(1) and cell B 14(2) may comprise several (e.g., 10) sub-frames (e.g., indexed from 0 to 9). A detail of frame 50(1) in an inset indicates sub-frames (SF) 52(1)-52(10) indexed as SF1, SF2, SF10. Each sub-frame (e.g., SF4 in the inset) may include a control region 54 and a data region 56. A value of "0" for an appropriate region of control region 54 may indicate that the ABS has been allocated for the sub-frame, and a value of 1 for the appropriate region of control region 54 may indicate that the ABS has not been allocated for the sub-frame. Sub-frames 1, 2, and 5 in frame 50(1) and sub-frames 3, 4 and 6 in frame 50(2) are configured as ABS in this example. Note that the ABS pattern configured in cell A 14(1) and cell B 14(2) can be communicated to neighboring cells via the X2 interface.

Figure 5:
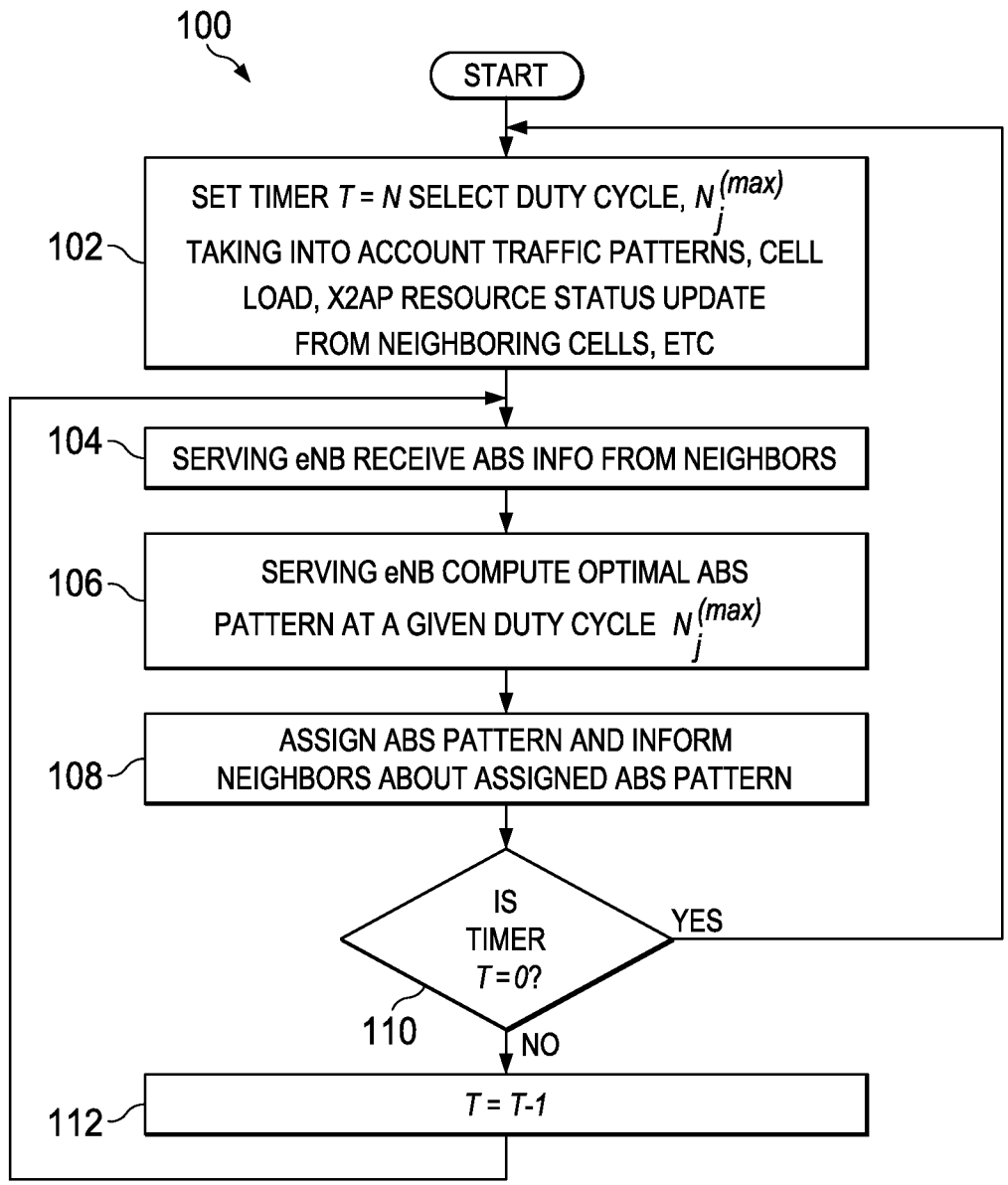
FIG. 5 is a simplified flow diagram illustrating example operations that may be associated with an embodiment of the communication system.

Turning to FIG. 5, FIG. 5 is a simplified flow diagram illustrating example operations 100 that may be associated with embodiments of communication system 10. At 102, a timer T may be set to N (any suitable number). A suitable PDCCH duty cycle $N_j^{(max)}$ may be selected at serving eNB j, for example, taking into account traffic patterns, cell load, X2AP resource status update message from neighboring eNBs, etc. At 104, the serving eNB j may receive ABS information from neighboring eNBs. At 106, the serving eNB j may compute an optimal ABS pattern at the selected PDCCH duty cycle $N_j^{(max)}$. At 108, the computed ABS pattern may be assigned to the frame, and neighboring eNBs may be informed about the assigned ABS pattern. At 110, a determination may be made whether the timer T has reduced to 0. If not, the timer may be decremented by 1 at 112, and the operations may loop back to 104. If the timer has reduced to zero, the operations may be reset, and start anew at 102.

Figure 6:
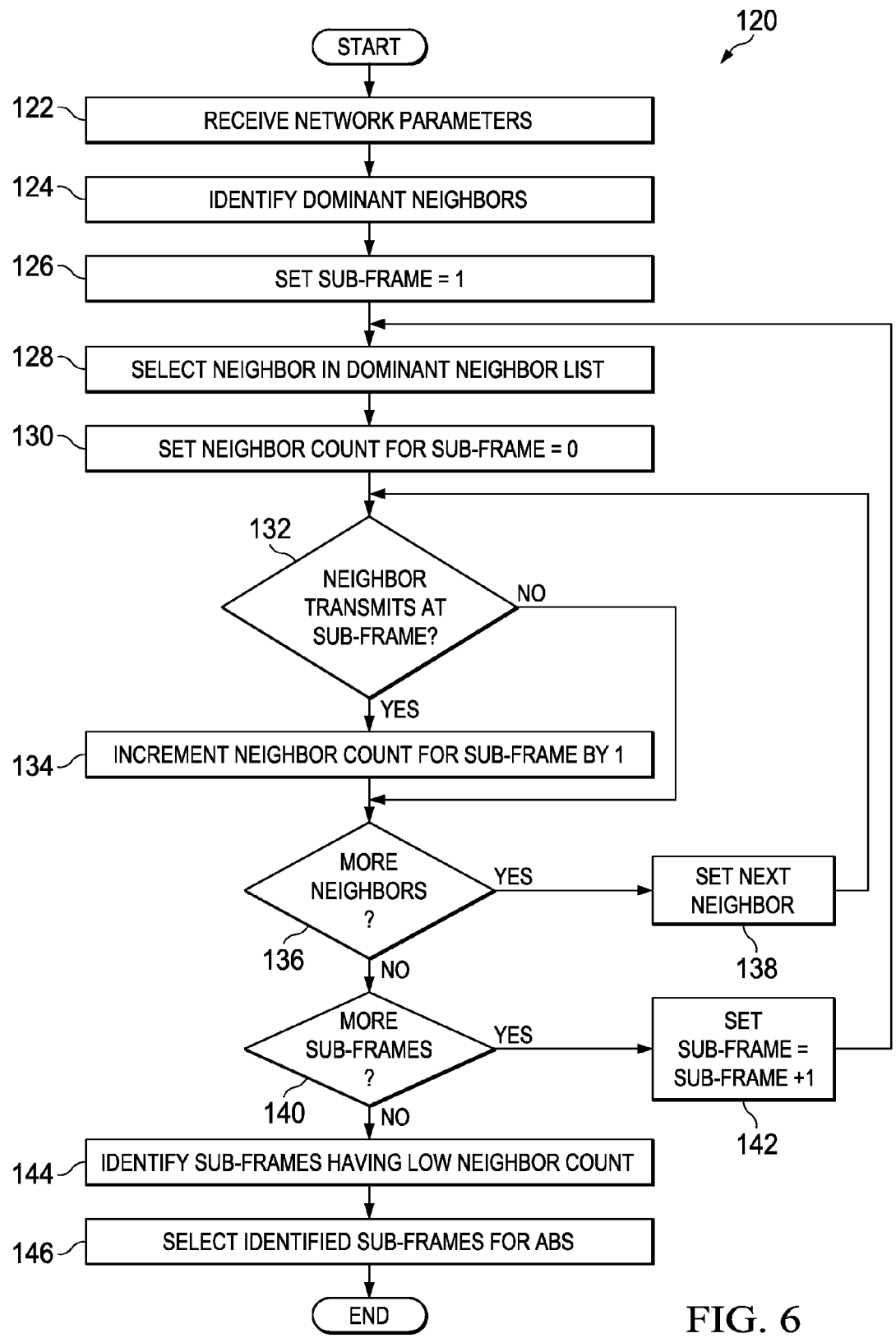
FIG. 6 is a simplified flow diagram illustrating other example operations that may be associated with an embodiment of the communication system.

Turning to FIG. 6, FIG. 6 is a simplified flow diagram illustrating example operations 120 that may be associated with embodiments of communication system 10. At 122, serving eNB 16(1) may receive network parameters 28 from neighboring eNBs 16(2)-16(N). At 124, the dominant neighboring eNBs may be identified. At 126, a sub-frame index may be set to 1. At 128, a neighboring eNB in dominant neighbor list 30 may be selected. At 130, a neighbor count for the sub-frame may be set to 0. At 132, a determination may be made whether the selected neighboring eNB transmits at the currently selected sub-frame (e.g., sub-frame 1 in the initial iteration). At 134, if the neighboring eNB transmits at the currently selected sub-frame, neighbor count for the sub-frame may be incremented by 1. At 136, a determination may be made whether more neighboring eNBs are listed in dominant neighbor list 30. If more neighboring eNBs are listed in dominant neighbor list 30, at 138, a next neighboring eNB in dominant neighbor list 30 may be selected, and the operations may loop back to 132. If the neighboring eNB does not transmit at the currently selected sub-frame, the operations may step to 136.

If more neighboring eNBs are not listed in dominant neighbor list 30, at 140, a determination may be made whether more sub-frames are present in the frame. If more sub-frames are present in the frame, at 142, a next sub-frame in the frame may be selected, for example, by choosing the sub-frame with the next higher sub-frame index. The operations may loop back to 128. If more sub-frames are not present in the frame at 140, sub-frames having low neighbor count may be identified at 144. At 146, the identified sub-frames may be used (e.g., configured) for ABS.

Figure 7:
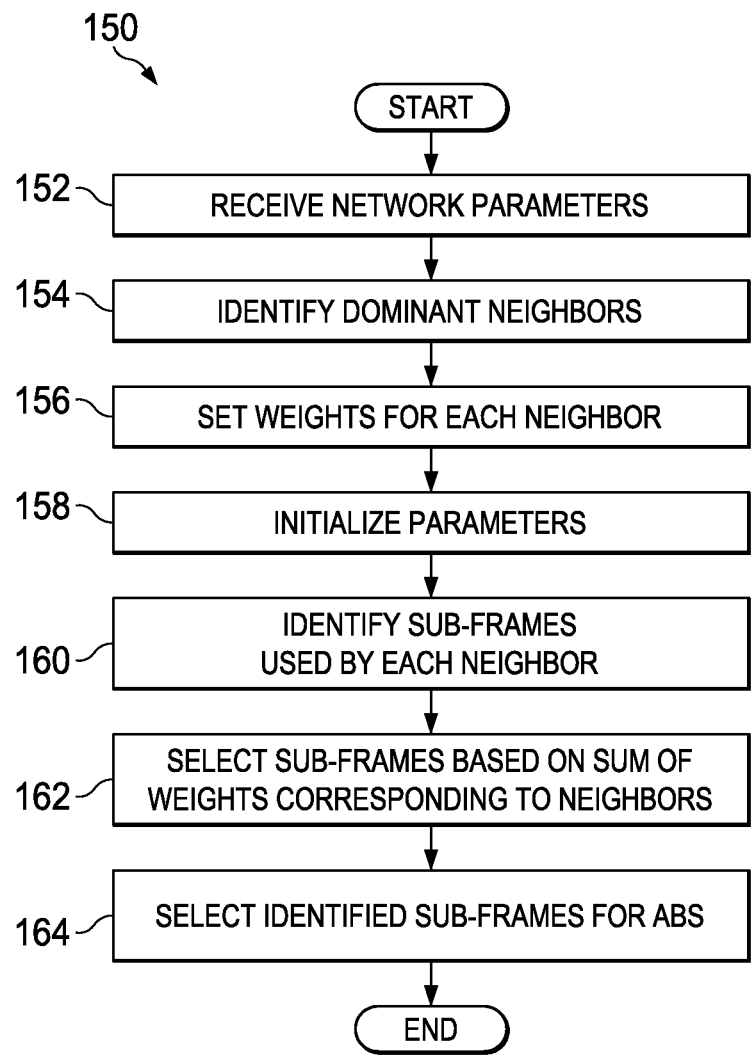
FIG. 7 is a simplified flow diagram illustrating yet other example operations that may be associated with an embodiment of the communication system.

Turning to FIG. 7, FIG. 7 is a simplified flow diagram illustrating example operations 150 that may be associated with embodiments of communication system 10. At 152, the serving eNB may receive network parameters 28. At 154, dominant neighboring eNBs may be identified. At 156, weights may be set (e.g., assigned) for each neighboring eNB, for example, based on a probability of higher interference from that neighboring eNB. A neighboring eNB with higher probability of interference (e.g., due to proximity, higher transmit power, etc.) may be assigned a higher weight. At 158, computation parameters (e.g., sub-frame index, neighbor count, etc.) may be initialized. At 160, sub-frames used by each neighboring eNB may be identified. At 162, sub-frames based on a sum of weights corresponding to neighboring eNBs may be selected. At 164, the identified sub-frames may be selected for ABS.

Figure 8:
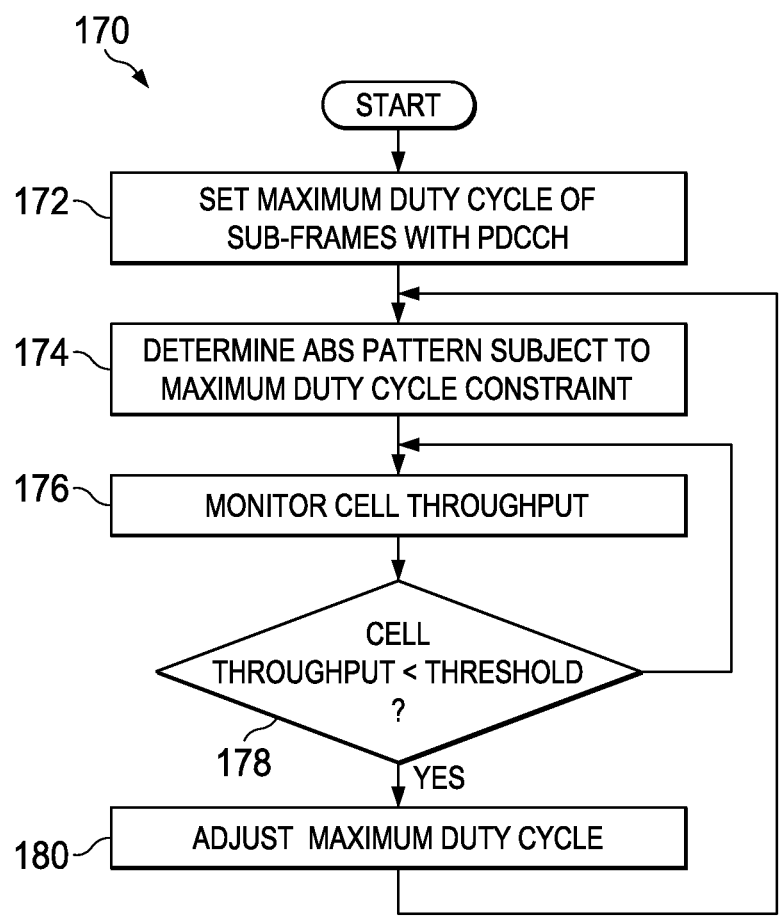
FIG. 8 is a simplified flow diagram illustrating yet other example operations that may be associated with an embodiment of the communication system.

Turning to FIG. 8, FIG. 8 is a simplified flow diagram illustrating example operations 170 that may be associated with embodiments of communication system 10. At 172, a maximum duty cycle for sub-frames with PDCCH (e.g., non-ABS sub-frames) may be set (e.g., initialized) at serving eNB 16(1). At 174, the ABS pattern may be determined subject to the maximum duty cycle constraint. At 176, cell throughput at serving cell 14(1) may be monitored. At 178, a determination may be made whether the cell throughput is less than a pre-configured threshold. If not, the operations may loop back to 176, and continue. If the cell throughput is less than the pre-configured threshold, the maximum duty cycle may be adjusted (e.g., increased) at 180. The operations may revert back to 174, and continue thereafter.

Figure 9:
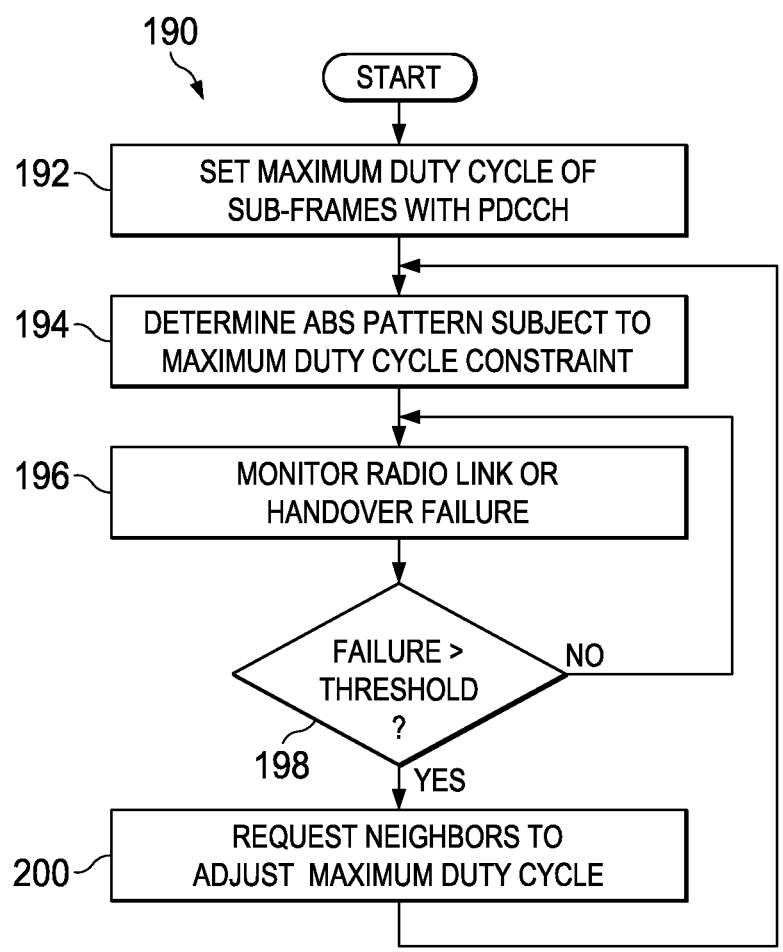
FIG. 9 is a simplified flow diagram illustrating yet other example operations that may be associated with an embodiment of the communication system.

Turning to FIG. 9, FIG. 9 is a simplified flow diagram illustrating example operations 190 that may be associated with embodiments of communication system 10. At 192, a maximum duty cycle for sub-frames with PDCCH (e.g., non-ABS sub-frames) may be set (e.g., initialized) at serving eNB 16(1). At 194, the ABS pattern may be determined subject to the maximum duty cycle constraint. At 196, the radio link and/or handover failure at serving cell 14(1) may be monitored. At 198, a determination may be made whether the radio link and/or handover failure is greater than a pre-configured threshold. If not, the operations may loop back to 196, and continue. If the radio link and/or handover failure is greater than the pre-configured threshold, a request may be sent to the relevant neighboring eNBS 16(2)-16(N) to adjust (e.g., increase) their respective maximum duty cycle at 200. The operations may revert back to 194, and continue thereafter.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Note also that an 'application' as used herein this Specification, can be inclusive of an executable file comprising instructions that can be understood and processed on a computer, and may further include library modules loaded during execution, object files, system files, hardware logic, software logic, or any other executable modules. Furthermore, the words "optimize," "optimization," "optimal" and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, eNB 16. In some embodiments, one or more of these features may be implemented in hardware, provided external to these elements, or consolidated in any appropriate manner to achieve the intended functionality. The various network elements (e.g., eNBs, UEs) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, eNB 16 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

A logical representation, such as those described herein, represents an abstract view of a network or network element by means of information objects representing network elements, aggregations of network elements, the topological relationship between the network elements, endpoints of connections (e.g., termination points), and transport entities (e.g., connections) that transport information between two or more termination points. The information objects defined in the logical representation are used, among others, by connection management functions. In this way, a physical implementation independent management can be achieved.

In some of example embodiments, one or more memory elements (e.g., memory element 24) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor 22) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication sytem 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication sytem 10 may be applicable to other exchanges or routing protocols. Moreover, although communication sytem 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving at a macrocell Evolved Universal Terrestrial Radio Access Network (E-UTRAN) nodeB (eNB) in a heterogeneous network (HetNet) comprising macrocells and picocells, a happiness indicator from a picocell eNB, wherein the picocell eNB extends its range to a cell range extension (CRE) region and otherwise transmits in a non-CRE region, wherein the happiness indicator comprises a measure of a relative data rate at a cell level in the CRE region and the non-CRE region; and
   adjusting an Almost Blank Subframe (ABS) pattern at the macrocell eNB based on the received happiness indicator, wherein the adjusted ABS pattern protects the picocell eNB from interference by the macrocell eNB.

2. The method of claim 1, wherein the picocell eNB communicates data with user equipment (UE) in the CRE region substantially simultaneously with the macrocell eNB transmitting ABS frames according to the adjusted ABS pattern.

3. The method of claim 1, wherein the happiness indicator increases at the picocell if an aggregate UE performance at the CRE region increases, dependent on a number of ABS frames used by the macrocell eNB.

4. The method of claim 1, wherein the happiness indicator comprises a comparison of a relative performance of the picocell eNB in the CRE region and the non-CRE region with a preconfigured threshold.

5. The method of claim 4, wherein the happiness indicator is one if the relative performance is less than or equal to the preconfigured threshold and zero otherwise.

6. The method of claim 4, wherein the happiness indicator comprises a ratio of the preconfigured threshold to the relative performance constrained to limit a value of the ratio.

7. The method of claim 4, wherein the relative performance comprises a ratio of a bit rate achievable by UEs in the picocell in the CRE region and the non-CRE region.

8. The method of claim 7, wherein the bit rate achievable by the UEs comprises a function of a number of ABS frames of the macrocell eNB in the picocell.

9. The method of claim 7, wherein an average bit rate per subframe achievable by the UEs in the picocell is a logarithmic function.

10. The method of claim 1, wherein the macrocell eNB receives happiness indicators from a plurality of picocell eNBs randomly deployed in the HetNet.

11. Non-transitory tangible media that includes instructions for execution, which when executed by a processor, is operable to perform operations comprising:
    receiving at a macrocell eNB in a HetNet comprising macrocells and picocells, a happiness indicator from a picocell eNB, wherein the picocell eNB extends its range to a CRE region and otherwise transmits in a non-CRE region, wherein the happiness indicator comprises a measure of a relative data rate at a cell level in the CRE region and the non-CRE region; and
    adjusting an ABS pattern at the macrocell eNB based on the received happiness indicator, wherein the adjusted ABS pattern protects the picocell eNB from interference by the macrocell eNB.

12. The media of claim 11, wherein the picocell eNB communicates data with UE in the CRE region substantially simultaneously with the macrocell eNB transmitting ABS frames according to the adjusted ABS pattern.

13. The media of claim 11, wherein the happiness indicator increases at the picocell if an aggregate UE performance at the CRE region increases, dependent on a number of ABS frames used by the macrocell eNB.

14. The media of claim 11, wherein the happiness indicator comprises a comparison of a relative performance of the picocell eNB in the CRE region and the non-CRE region with a preconfigured threshold.

15. The media of claim 14, wherein the relative performance comprises a ratio of a bit rate achievable by UEs in the picocell in the CRE region and the non-CRE region.

16. An apparatus in a HetNet comprising macrocells and picocells, wherein the apparatus comprise:
    a memory element for storing data; and
    a processor, wherein the processor executes instructions associated with the data, wherein the processor and the memory element cooperate, such that the apparatus is configured for:
    receiving at a macrocell eNB in the HetNet a happiness indicator from a picocell eNB, wherein the picocell eNB extends its range to a CRE region and otherwise transmits in a non-CRE region, wherein the happiness indicator comprises a measure of a relative data rate at a cell level in the CRE region and the non-CRE region; and
    adjusting an ABS pattern at the macrocell eNB, wherein the adjusted ABS pattern protects the picocell eNB from interference by the macrocell eNB.

17. The apparatus of claim 16, wherein the picocell eNB communicates data with UE in the CRE region substantially simultaneously with the macrocell eNB transmitting ABS frames according to the adjusted ABS pattern.

18. The apparatus of claim 16, wherein the happiness indicator increases at the picocell if an aggregate UE performance at the CRE region increases, dependent on a number of ABS frames used by the macrocell eNB.

19. The apparatus of claim 16, wherein the happiness indicator comprises a comparison of a relative performance of the picocell eNB in the CRE region and the non-CRE region with a preconfigured threshold.

20. The apparatus of claim 19, wherein the relative performance comprises a ratio of a bit rate achievable by UEs in the picocell in the CRE region and the non-CRE region.

* * * * *